United States Patent [19]
Goldrian

[11] Patent Number: 5,742,798
[45] Date of Patent: Apr. 21, 1998

[54] COMPENSATION OF CHIP TO CHIP CLOCK SKEW

[75] Inventor: Gottfried Andreas Goldrian, Boeblingen, Germany

[73] Assignee: International Business Machines Corporation, Armonk, N.Y.

[21] Appl. No.: 695,465

[22] Filed: Aug. 12, 1996

[30] Foreign Application Priority Data

Aug. 9, 1996 [EP] European Pat. Off. .............. 96112880

[51] Int. Cl.⁶ .................................................. G06F 1/12
[52] U.S. Cl. .................................................. 395/551
[58] Field of Search ............................ 395/551, 553, 395/558; 375/354, 356, 359

[56] References Cited

U.S. PATENT DOCUMENTS

| | | | |
|---|---|---|---|
| 4,295,220 | 10/1981 | Blum et al. | 371/61 |
| 5,359,727 | 10/1994 | Kurita et al. | 395/551 |
| 5,481,573 | 1/1996 | Jacobowitz et al. | 395/551 X |
| 5,550,875 | 8/1996 | Bennett | 375/356 |

Primary Examiner—Thomas M. Heckler
Attorney, Agent, or Firm—Lynn L. Augspurger

[57] ABSTRACT

Information about the relative phase relationship of the clocks of two chips that are connected with an inter-chip connection is used to adjust the clocks. In the method proposed by the invention, transitions between a good data transfer behaviour to a worse data transfer behaviour are detected as a function of the variable clock delays which delay the chip clock, and a clock delay value between the transitions is chosen. Thus, an optimization of data transmission is achieved, and it can be shown that with this procedure, the clock skew is accurately compensated as well. Additionally, a method for quantifying the variable clock delay, which consists of a multitude of delay elements arranged in a delay chain, is given. In order to do this, the number of delay elements necessary for a delay of half a clock cycle is determined. Thus, a connection between the length of a clock cycle and the delay caused by one delay element is established. With this method of quantifying delays, it is possible to transmit information about the value of the variable clock delay between chips. It is also possible to transmit this information to a central clock adjustment unit, which is especially advantageous in a multi-chip system. The central clock adjustment unit can calculate the appropriate delay values for each chip and thus synchronize a multutude of chips.

12 Claims, 10 Drawing Sheets

5,742,798

1

COMPENSATION OF CHIP TO CHIP CLOCK SKEW

FIELD OF THE INVENTION

The present invention relates to a method of synchronizing the chip clocks of different chips, in order to optimize the speed of data transfer between the chips.

BACKGROUND OF THE INVENTION

In order to provide means for efficient communication between a multitude of chips on a card or even on a board, the individual chip clocks of the different chips have to be synchronized with respect to each other. The highest data transfer rates on chip-to-chip interconnections can be achieved if the clocks of the chips that take part in the communication are accurately in-phase. In this case, the time required for safe data transmission between chips is at the minimum. Therefore, compensating clock skew is important for speeding up data transfer between chips. As the clock cycle gets smaller, timing limits become more and more severe, and clock skew has to be restricted to a minimum.

VLSI logic chips for high performance applications already have a clock distribution which guarantees that all clocks of a synchronous logic are distributed so well across the chip that the clock skew between the chips is minimized.

There already exists a scheme to keep the clock skew low between all chips on a card or even within a board. A PLL (Phased Locked Loop) integrated in each logic chip is used for this purpose.

These PLLs are supplied from one central clock chip with a reference clock. The PLLs lock the phase of the chip clocks to this reference clock. Thus, the individual chip clocks can be synchronized.

When distributing the central clock chip's signal to all the chips on a card, the interconnections between the central clock chip and the other chips have to be of equal length. Otherwise, the central clock signal would arrive at each chip with a different wiring delay. Because of this consideration, tough wiring rules were established. One example is the rule that the wire length of the clocks from the clock chip have to be the same within 1 cm tolerance. This rule requires months of manual wiring without any guarantee of success.

However, even with these methods the ratio of the chip to chip clock skew versus the cycle time on the chip interface increases with every generation of VLSI technology. The reason is that with every step in technology the number of latches and with it the clock load increases drastically and the clock cycle time reduces. Therefore, although the clock skew between chips is kept as low as possible it can cost up to 25% of the clock cycle of high performance chips.

OBJECT OF THE INVENTION

The object of the invention is therefore to introduce a method for compensating the skew between clocks on different chips, in order to synchronize clocks with high accuracy.

A further object of the invention is to synchronize the chip clocks with respect to the chip interfaces where the clock is actually used.

A further object of the invention is to provide chip clocks that allow a safe data transmission between chips with the lowest possible transfer delay.

A further object of the invention is to minimize the required hardware for the adjustment of clocks.

2

Another object of the invention is to provide a method for clock skew compensation that allows to overcome the strict wiring rules for the clock distribution.

Another object of the invention is to provide a method for quantifying the delay applied to a chip clock, in order to allow communicating this delay value to other chips.

A further object of the invention is to provide means for synchronizing a multitude of chip clocks.

SUMMARY OF THE INVENTION

The main idea of the invention is to adjust the clock skew with respect to interfaces to other chips. Information about the relative phase relationship of the clocks of two chips that are connected with an inter-chip connection is used to adjust the clocks. In the method proposed by the invention, transitions between a good data transfer behaviour to a worse data transfer behaviour are detected as a function of the variable clock delays, and a clock delay value in between the transitions is chosen. Thus, an optimization of data transmission is achieved, and it can be shown that with this procedure, the clock skew is accurately compensated as well.

An advantage of the method proposed is that a very accurate elimination of clock skew can be achieved. A low amount of extra hardware is necessary to perform the method.

A further advantage is that the compensation of clock skew is done with respect to the interfaces where data transmission actually takes place and where accurate clocking has an impact on the efficiency of data transfer.

Additionaly, a method for quantifying the variable clock delay, which consists of a multitude of delay elements arranged in a delay chain, is given. In order to do this, the number of delay elements necessary for a delay of half a clock cycle is determined. Thus, a connection between the length of a clock cycle and the delay caused by one delay element is established.

With this method of quantifying delays, it is possible to transmit information about the value of the variable clock delay between chips.

It is also possible to transmit this information to a central clock adjustment unit, which is especially advantageous in a multi-chip system. The central clock adjustment unit can calculate the appropriate delay values for each chip and thus synchronize a multitude of chips.

BRIEF DESCRIPTION OF THE DRAWINGS

The above set forth and other features of the invention are made more apparent in the ensuing Detailed Description of the Invention when read in conjunction with the attached drawings, wherein.

DETAILED DESCRIPTION OF THE INVENTION

Figure 1:
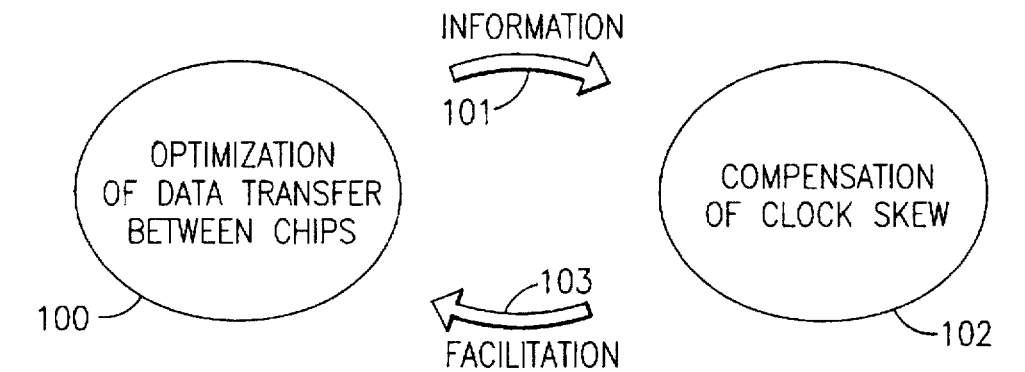
FIG. 1 depicts the interplay between clock skew compensation and data transfer optimization.

In FIG. 1, the main idea of the invention is sketched. In the course of data transfer optimization between chips (100), information about the relative delay of the chip clocks involved is gained (101). This information obtained by analyzing data transfer between chips is, in a next step, used for adjusting the chip clocks (102). Thus, synchronous clocks are provided on the chips involved. Further data transfer is affected by the chip clocks being in-phase, because synchronous clocks facilitate (103) an optimization of the data transfer rate (100).

Figure 2:
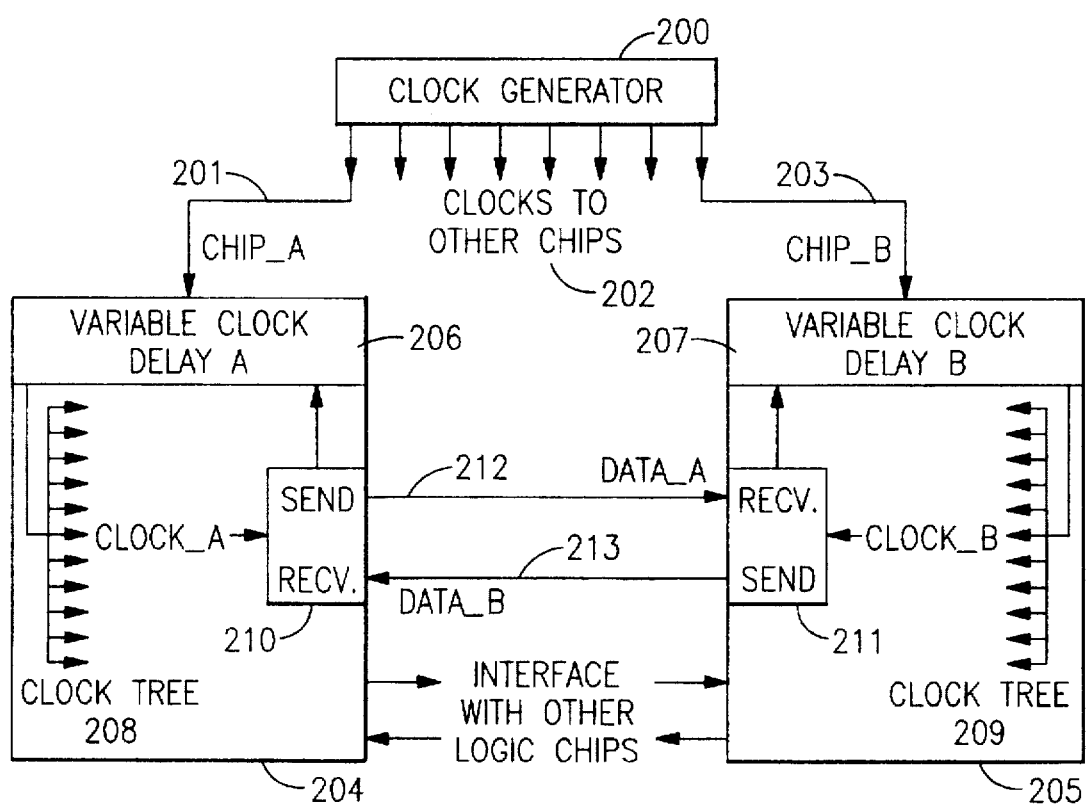
FIG. 2 is a block diagram that shows two chips and their interconnections, with both chips being clocked by a central clock generator.

FIG. 2 shows a setup where various VLSI chips are supplied with one central clock signal. A separate clock chip (200) generates one central clock, which is transmitted via signal line (201) to chip A (204), and via signal line (203) to chip B (205). The reference clock signal of all the other chips is also supplied (202) by the clock generator (200). On each of the chips A and B, the incoming clock signal first has to pass a variable clock delay (206, 207) before it is distributed via a clock tree (208, 209) to the various functional units. The adjustment of the variable clock delay on chip allows to synchronize chip clock A and B with respect to each other. A driver module (210, 211) which is responsible for inter-chip data transmission is implemented both on chip A (204) and on chip B (205). This functional unit, which hosts interfaces for sending and receiving data, is supplied with a clock signal via the respective clock trees (208, 209). Data can be sent from chip A to chip B via chip A's driver module (210), the inter-chip connection (212) and chip B's driver module (211). Data transmission in the opposite direction is done via chip B's driver module (211), the inter-chip connection (213) and chip A's driver module (210). In order to utilize information about the relative clock skew between chip clock A and B for eliminating that clock skew, a feedback line has to connect the driver module (210, 211) to the respective variable clock delay (206, 207). Clock skew information obtained by exchanging data between chip A and B can thus be used for the adjustment of the respective clock's delay element.

Figure 3:
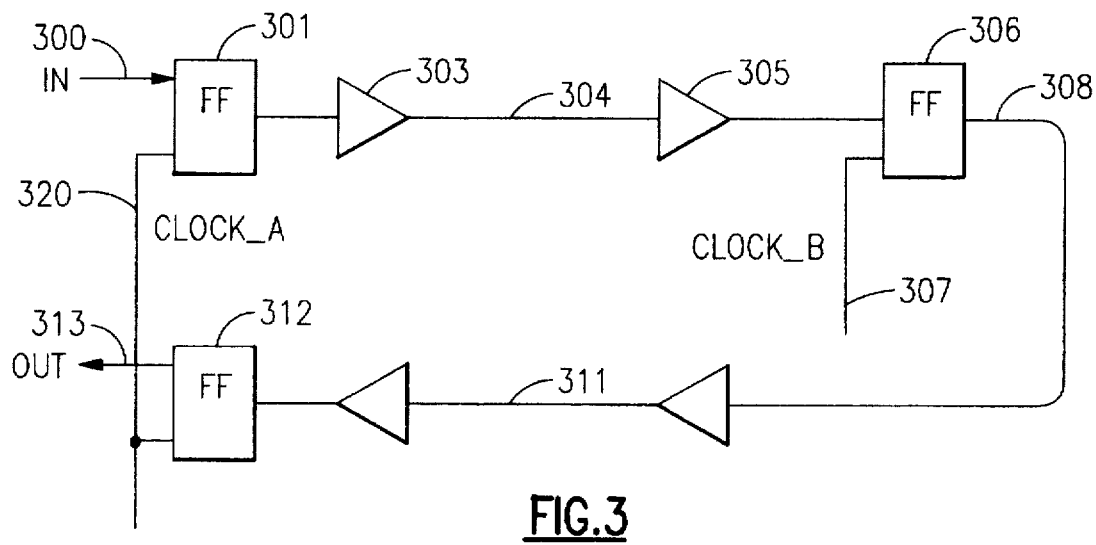
FIG. 3 shows a data transmission line that connects chips A and B.

In FIG. 3, a setup consisting of drivers, signal lines and receivers for realizing inter-chip data transfer is shown. Data (300) that chip A intends to transmit to chip B is fed to the Flip-Flop (301). The Flip-Flops of chip A (301, 312) are supplied with Chip A's clock signal, CLOCK_A (320). With every positive transition of the signal CLOCK_A (320), data bits are clocked onto the inter-chip connection (304) via the Flip-Flop (301) and a driver (303). At the receiving chip, the incoming signal (304) is first amplified by a driver (305) before it is fed to a Flip-Flop (306). The Flip-Flops of chip B are all supplied with one clock signal CLOCK_B (307). At this receiving Flip-Flop (306), the incoming data is detected with every positive transition of CLOCK_B (307), and sent back (308) to chip A. At chip A, the incoming data is first amplified, the data bits are detected with every positive transition of CLOCK_A (320).

Figure 4:
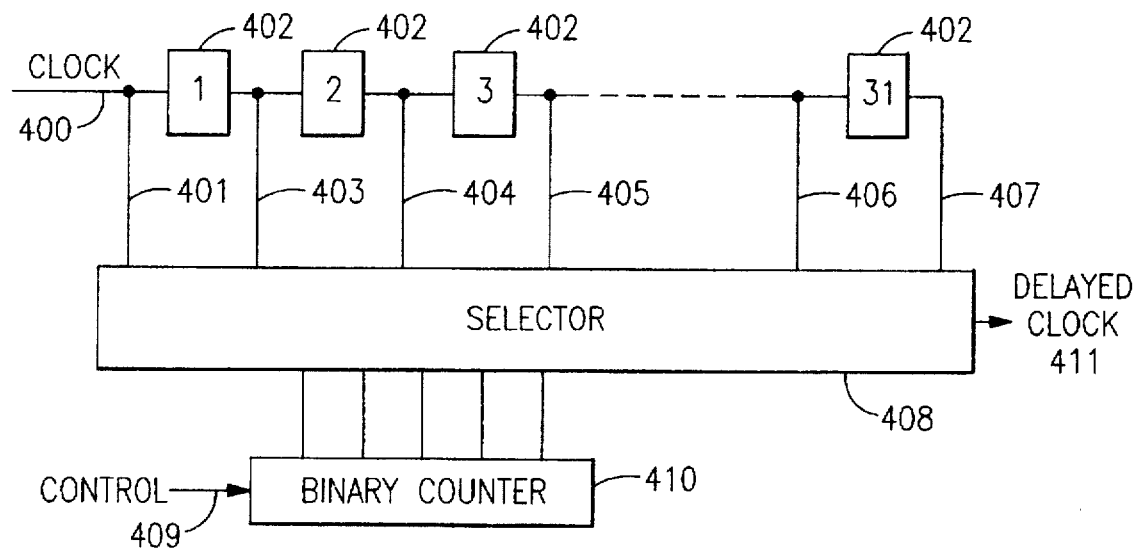
FIG. 4 is a delay circuit that is used for the variable clock delay.

In FIG. 4, an adjustable delay element is depicted, as it is used for the variable clock delay on chip A and B in FIG. 2 (206, 207). A clock signal (400) passes through a delay chain that consists of a number of elementary delays (402). The more elementary delays (402) the signal passes, the more it gets delayed with respect to the incoming clock (400). At line (401) the clock is not delayed at all, at line (403) it is delayed by one unit, at line (404) it is delayed by two units, etc. With the selector (408), a connection between one of the delayed signals (401, 403, 404, . . . ,407) and the output (411) can be established. The number of elementary delays (402) that the clock signal (400) has to pass before it is output as delayed clock (411) can be chosen with the selector (408). A binary counter (410) is coupled to the selector (408) in order to control the number of elementary delays (402) that clock signal (400) has to pass. The binary counter (410) receives its counting pulses via a control line (409).

Each elementary delay (402) in FIG. 4 consists of two inverters which are connected in series. When actually measuring the time delay caused by one elementary delay (402), large deviations are encountered. The source of these deviations is to be seen in the manufacturing process for chips, where certain deviations of the physical parameters have to be tolerated.

Therefore, the number of elementary delays included in the clock path can not be seen as an accurate measure of the necessary time delay. Communicating the number of elementary delays utilized is of no value, as long as this information can not be related to accurate timing information. For this reason the delay caused by one single elementary delay (402) has to be measured.

Figure 5:
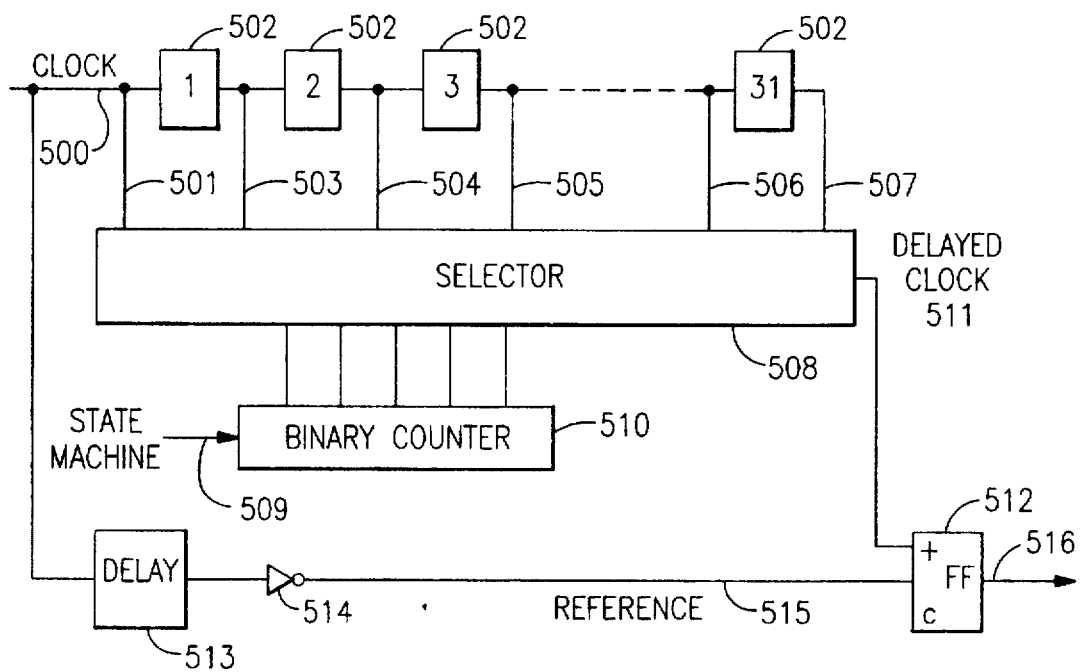
FIG. 5A shows how the delay circuit of FIG. 4 can be gauged using the clock cycle as a standard.
FIG. 5B gives a timing chart of the signals in FIG. 5A.

FIG. 5A shows how the delay circuit of FIG. 4 can be gauged using the clock cycle as a standard. In order to quantify the delay caused by the elementary delays (502), the number of elementary delays necessary for phase reversal of the clock signal (500) is detected. For this reason, the clock (500) is fed to a delay chain that consists of elementary delays (502). The number of elementary delays (502) that the clock signal has to pass is determined by the selector (508), which is controlled by the binary counter (510). The delayed clock (511) is fed to the positive input of Flip-Flop (512). A reference signal (515) is connected to the clock input of Flip-Flop (512), with the state of the delayed clock signal (511) being detected at every positive transition of the reference clock signal (515). The reference clock signal (515) is generated by delaying (513) and inverting (514) the original clock signal (500). Delay (513) is introduced to the reference clock signal path in order to compensate the delay caused by the selector (508) when no elementary delay (502) is included in the delay path, as it is the case when line (501) is selected. Therefore the reference clock signal (515) and the delayed clock (511) are exactly out of phase, when the number of elementary delays (502) in the delay chain is zero.

Figure 5B:
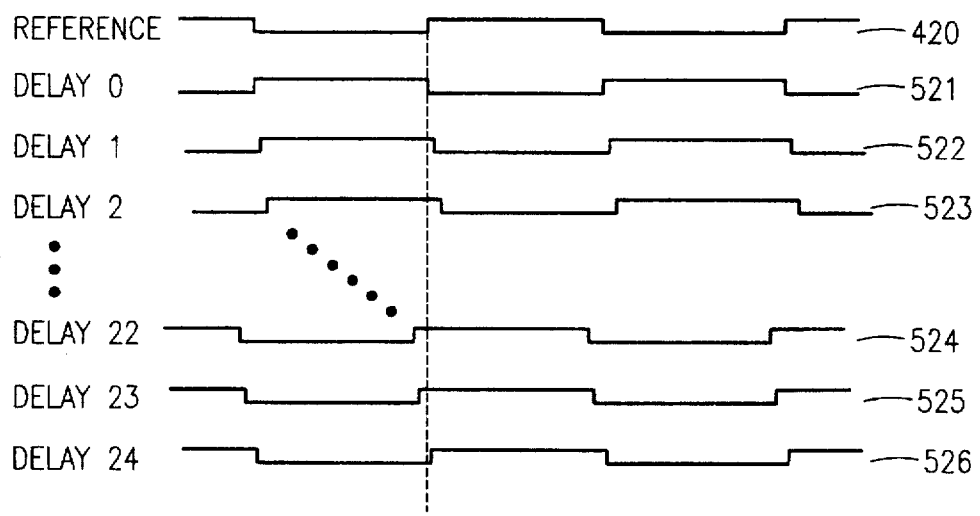

This is shown in FIG. 5B. Signal (521) is phase-shifted by exactly 180 degrees with respect to the reference clock signal (520). The signals (522) to (526) show additional tiny phase-shifts caused by including, one after the other, additional elementary delays (502) in the delay path. Signal (522) corresponds to line (503) being selected, which means that one additional elementary delay is introduced, signal (523) is obtained when selecting line (504), etc.

The state of the delayed clock signal (511) is detected with every positive transition of the reference clock signal (520).

as it is indicated by the dotted line in FIG. 5B. Therefore, in signal (522) to (525), the state of the output (516) of Flip-Flop (512) is 'high'. The state of signal (516) switches to 'low' when signal (526) is fed to the Flip-Flop (512). This means that 23 additional elementary delays (502) have to be introduced to the path of the delayed clock (511) in order to cause a phase reversal with respect to the initial clock (500). Thus, a delay of half a clock cycle can be caused by a delay chain consisting of 23 elementary delays (502), and thus, one elementary delay (502) corresponds to 1/46 of a processor clock cycle. This information can be used to quantify delay information that is exchanged between chips.

Figure 6:
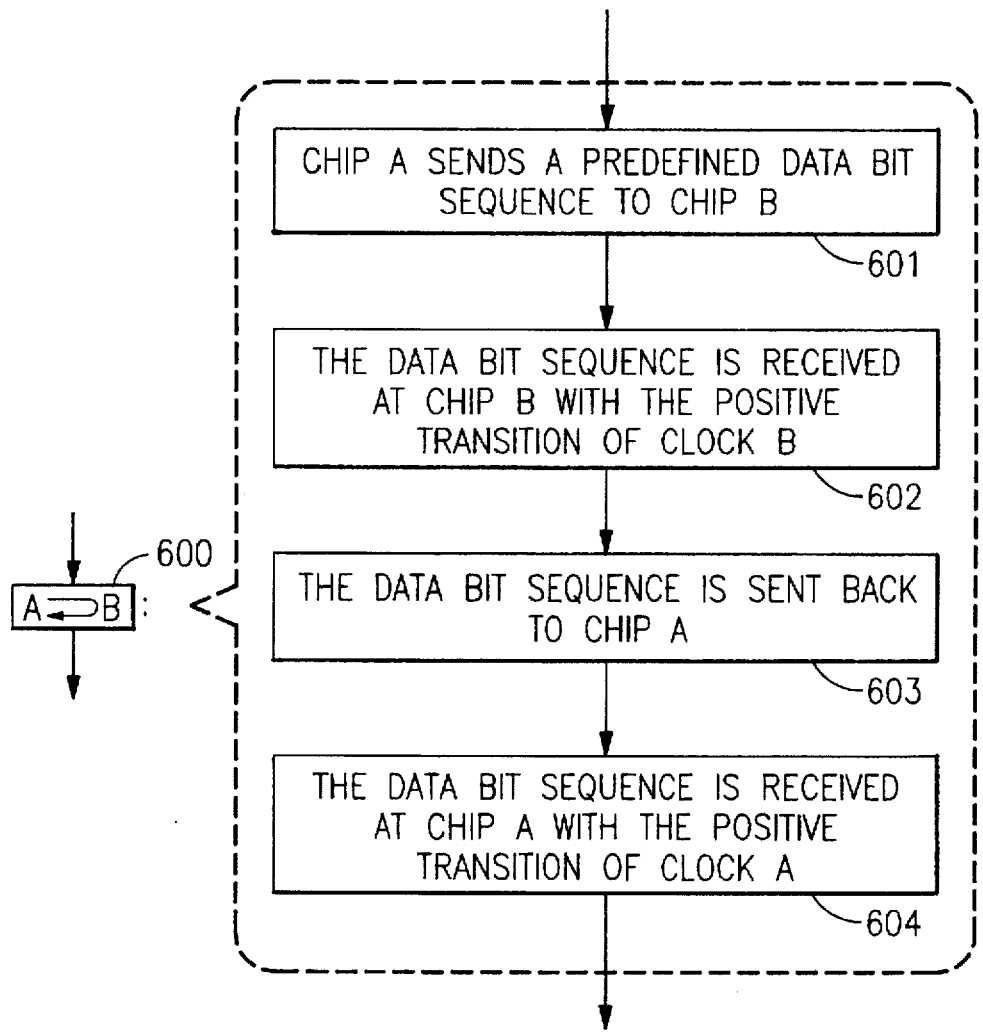
FIG. 6 shows how a predefined bit sequence is sent from chip A to chip B and back in order to determine the wiring delay.

Information about the relative clock skew between clock A on chip A and clock B on chip B is obtained by sending back and forth a predefined bit pattern between chip A and chip B. The steps of this procedure are shown in FIG. 6. A timing chart of the signals that occur when the method steps of FIG. 6 are carried out is given in FIG. 8A.

Chip A starts by sending a predefined data bit sequence to chip B (601). This bit pattern is clocked onto the inter-chip connection with clock A (800). The bit sequence that was sent by chip A (801) suffers a wiring delay before it arrives at chip B (DATA A, 802).

In the next step (602) the data bit sequence is received at chip B with every positive transition of clock B. Clock B (803) detects the state of the inter-chip connection at each positive transition. Thus the signal DATA A RCV (804) is obtained: At the first rising edge of clock B (803) in FIG. 8A, the state of signal DATA A is 'low'. At the next rising edge of clock B, it is 'high', etc.

In step (603) the received data bit sequence, the signal DATA A RCV (804), is immediately sent back from chip B to chip A. Again the distance between chip A and chip B leads to a phase shift caused by the wiring delay. DATA B (805) is the signal that arrives at the input of chip A.

In the last step (604) this data bit sequence is received at chip A. Again the state of the inter-chip connection is sensed with every positive transition of clock A (806), and the signal DATA B RCV is obtained at chip A. When comparing the initial bit pattern (801) that was sent from chip A to chip B to the bit pattern DATA B RCV (807) that was returned from chip B to chip A, it can be seen that the total travelling time of the signal from chip A to chip B and back was two cycles of clock A (800).

The method for the adjustment of clock skew that will be described next detects this travelling time as a function of the variable clock delays on chip A and B. A flowchart of said method is given in FIGS. 7A–7C.

In the first step (700), both chips A and B reset their respective delays. Then, the procedure depicted in FIG. 6 is applied (701). Chip A, which has initiated sending back and forth the initial bit pattern, detects the number of clock A cycles that have passed until the signal has been received again. This number of clock cycles n(real) is compared to a given number of cycles n(ideal) that the signal is expected to travel (702). In case both numbers are the same, one can conclude that the clock skew between chip A and chip B is rather small.

Chip A now starts incrementing its clock delay A by adding one elementary delay to the delay chain (710). Again, the procedure of FIG. 6 is carried out (711). The steps (710) and (711) are repeated until the number of cycles the signal needs for travelling from chip A to chip B and back is not equal to n(ideal) any more (712). The value of clock delay A when this occurs, A1, is stored (713). Thus, it has been possible to determine one borderline of the range of possible delay values where the system's data transmission behaviour starts to get worse.

In the next step (714), delay A is completely reset. Then the initiative is transferred to chip B which now starts incrementing its clock delay B by adding one extra elementary delay (715). Next, chip B sends a bit pattern to chip A, which is received by chip A and returned to chip B (716). The number of clock B cycles that the signal has spent for travelling from B to A and back, n(real), is compared to the expected travel time n(ideal) in step (717). As long as they are equal, step (715) and (716) are repeated. At some clock B delay B1, though, n(real) starts to deviate from n(ideal). This delay B value B1 is stored in step (718). The second borderline where data transmission starts to get worse is found.

In order to compensate the (small) clock skew, the stored delay values A1 and B1 are compared in step (719). A prerequisite for being able to compare both values is that the delays can be quantified. A method of gauging the elementary delays was given in FIG. 5A and 5B. If A1 is larger than B1, delay A is set to a value that is equal to (½)*(A1−B1) (720). In case A1 is smaller than B1, delay B is set to (½)*(B1−A1) (721). Now, the clock skew between chip A and chip B is compensated. Information obtained by transmitting data according to FIG. 6 has been used for the adjustment of two clocks.

Next, let us consider the case that clock delay A and clock delay B are both reset (700), that a bit pattern has been transferred from chip A to chip B and back (701), and that the number of clock A cycles the bit pattern needs for travelling back and forth, n(real), is not equal to the expected number of cycles n(ideal) (702). This situation implies that the clock skew between clock A and clock B is somewhat larger than in the case discussed so far. The task is to find the range of delay values of clock delay A or B, where n(real) is equal to n(ideal).

In a first step chip A starts incrementing clock delay A by succesively adding elementary delays to the delay chain (730). In step (731) it is checked whether the total clock delay A has already reached a maximum delay value or not. In case the maximum delay value has not been surpassed yet, chip A initiates transmitting a bit pattern from chip A to chip B and back (732), and the number of clock cycles n(real) is recorded. In step (733), n(real) is compared to n(ideal). In case they are still not equal, clock delay A is further increased (730), and steps (731), (732) and (733) are carried out again, until either the maximum delay value is reached or n(real) is equal to n(ideal). In case n(real) becomes equal to n(real), the delay A value A1 where this transition occurs is stored (734).

Thus, by incrementing delay A it has been possible to partly compensate the clock skew between clock A and clock B. The data transmission behaviour of the system has improved with respect to the initial situation, because the number of clock A cycles necessary for one complete data transfer from chip A to chip B and back, n(real), is now equal to the expected number n(ideal).

In order to find the second border of the range of clock delay A values where the condition n(real)=n(ideal) is fullfilled, clock delay A is further incremented (735). Chip A sends and receives its bit pattern in step (736), and in step (737), chip A detects whether a transition of n(real) has occurred such that n(real) is no longer equal to n(ideal). If this is not the case, and n(real) is still equal to n(ideal), delay A is further incremented (735) and steps (736), (737) are repeated until n(real) changes its value. In step (738), this second transition value A2 of clock delay A is stored.

Finally, clock delay A is set to mean value of both transition delays, to (½)*(A2+A1) (739). This is the delay A value required for synchronizing clock A and clock B.

Let us now have a look at the situation where initially, n(real) is not equal to n(ideal), and where it is not possible to fullfill the condition n(real)=n(ideal) by incrementing clock delay A (730). After several iterations clock delay A exceeds the predefined maximum delay value (731, 740). If this occurs, clock delay A is reset (750) and chip B starts incrementing its clock B delay (751). The bit pattern is now sent from chip B to chip A and returned to chip B (752). If n(real) changes its value in a way that the condition n(real)=n(ideal) is fullfilled (753), then the delay B value of this transition, B1, is stored (754). Otherwise, steps (751), (752) and (753) are repeated.

In case the transition delay value B1 has been successfully detected, the system is now in the range of delay values where n(real)=n(ideal). In order to find the second transition delay value, clock delay B is further incremented by chip B in (755). Again, a bit sequence is transferred from B to A and back (756). N(real) is detected and compared to n(ideal) in step (757). The system leaves the loop (755), (756), (757) when a transition of the value of n(real) occurs such that n(real) is no longer equal to n(ideal) any more. In this case, the second transition delay value, B2, has been found, and this value is stored (758). The mean value of both transition delay B1 and B2 is calculated, which is (½)*(B1+B2), and in step (759), clock delay B is set to that value in order to compensate clock skew.

Figure 7A:
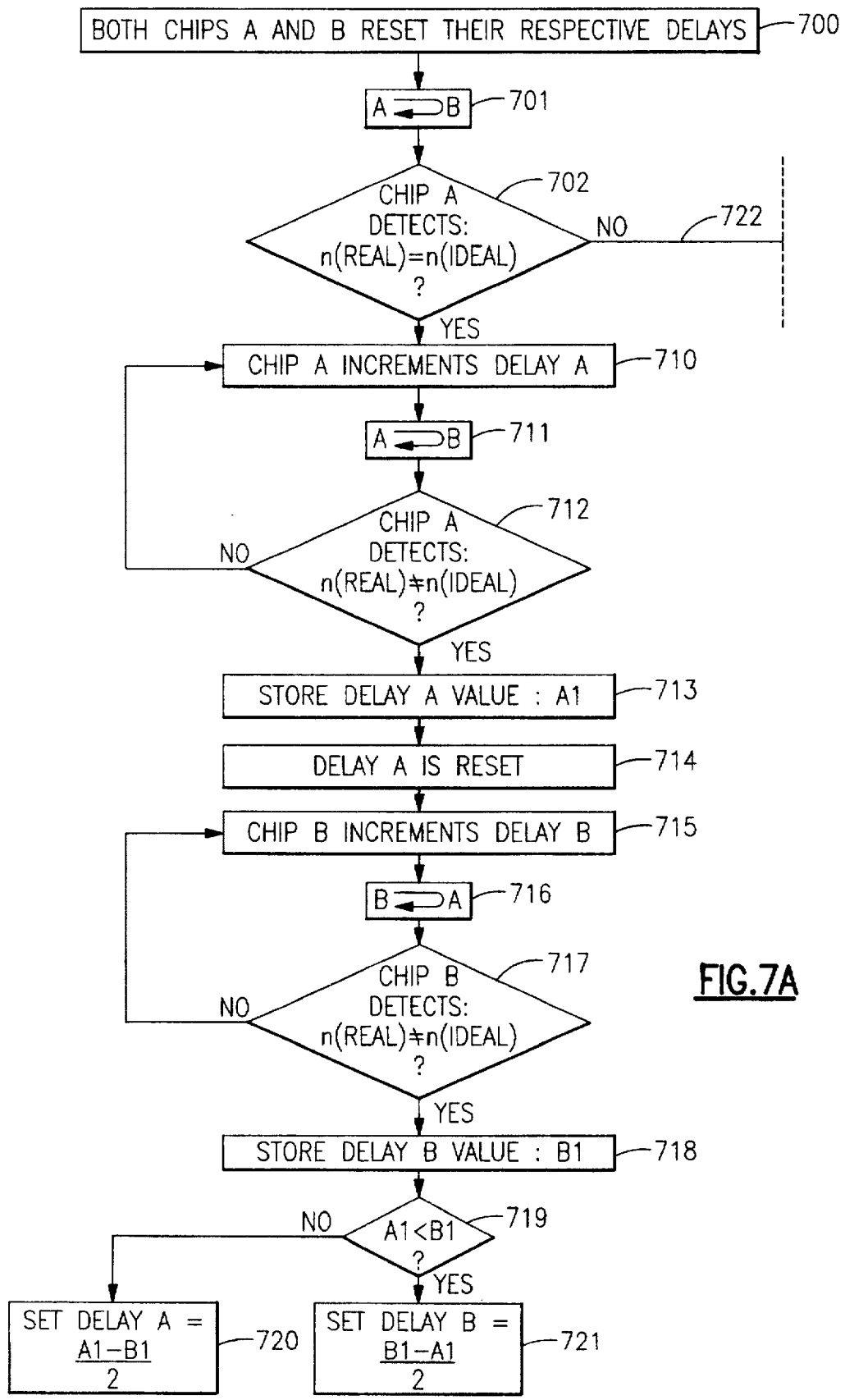
FIGS. 7A–7C give a flow chart for compensating the clock skew between two chips A and B.
Figure 7B:
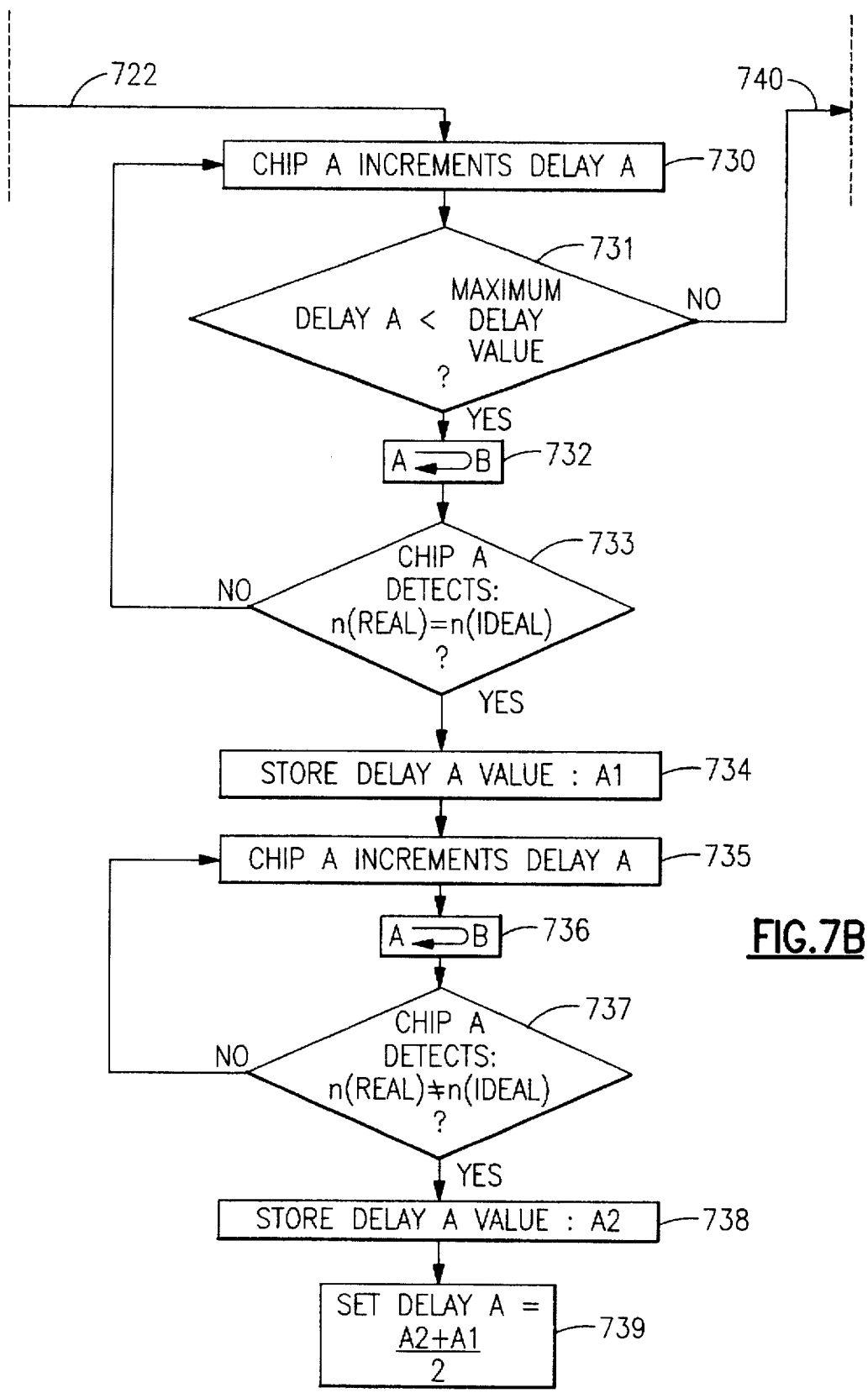
Figure 7C:
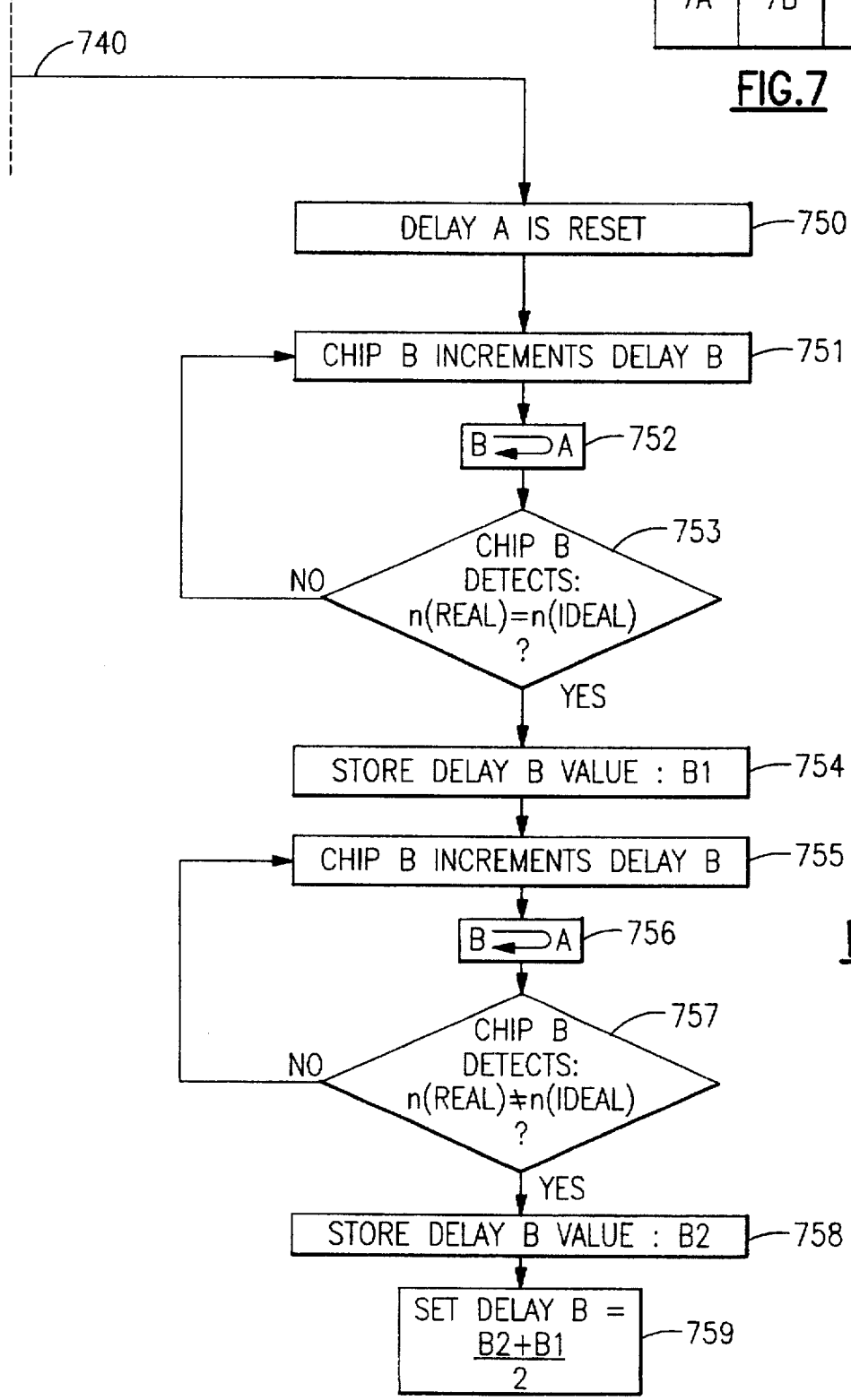
Figure 8A:
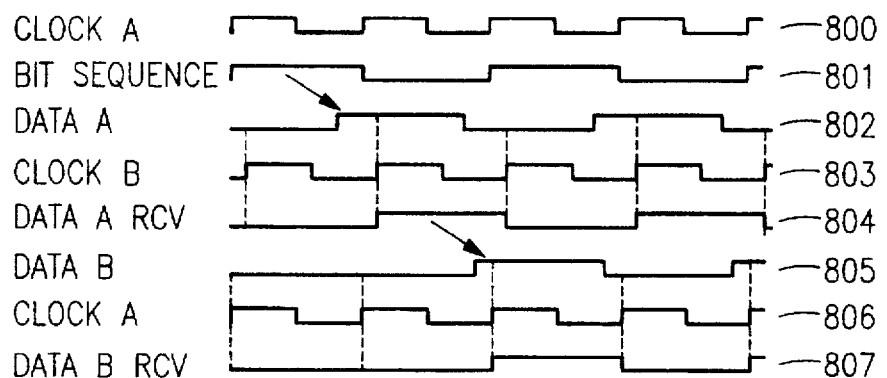
FIGS. 8A–8D show the timing of the signals that arise when synchronizing chip clocks according to the method given in FIGS. 7A–7C in case the clock skew between chip A and B is small.

In FIGS. 8A–8D and 9A–9D, timing charts for various situations that arise in FIGS. 7A–7C are given. In FIG. 8A, a situation is depicted where clock A (800) is 'early' with respect to clock B (803) when both clock delay A and clock delay B are reset (step (700) in FIGS. 7A–7C). As described earlier, a bit sequence (801) is sent from chip A to chip B, where this signal (DATA A, 802) is received with clock B and thus becomes the signal DATA A RCV (804). This signal is sent back to chip A (DATA B, 805), where it is received with clock A (806). The signal DATA B RCV (807) can now be compared to the initial bit sequence (801), and a transfer delay of two clock A cycles is detected. Thus, n(real) is equal to 2, and as the expected number n(ideal) of clock cycles needed on a conventional inter-chip connection is also two, n(real) equals n(ideal)=2 in step (702) of FIGS. 7A–7C.

Figure 8B:
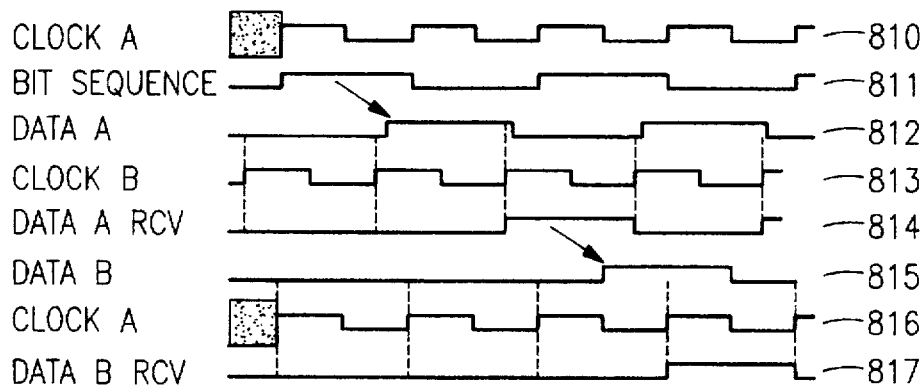

According to the flowchart of FIGS. 7A–7C, the next step is to increment clock delay A, until a transition of n(real) can be observed (712). In FIG. 8B a situation is shown where this transition of n(real) has just occurred. An additional clock delay of ⅛ of a clock cycle has been applied to clock A (810). Clock delay B is set to zero. Again, a bit squence is transferred from chip A and chip B and back, and when comparing the initial bit sequence (811) with the received bit sequence DATA B RCV (817) a relative transfer delay of 3 clock cycles can be observed. This means that the value of n(real) has switched from 2 to 3 when an additional clock A delay of ⅛ is applied. This clock delay A value is stored to variable A1, according to step (713) in FIGS. 7A–7C. Delay A is reset (714), and in step (715), chip B starts to increment delay B until the value of n(real) changes (717).

Figure 8C:
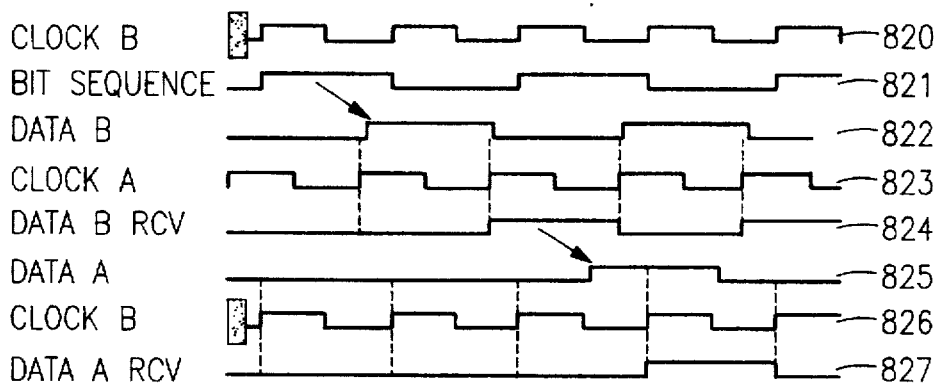

This is shown in FIG. 8C. There, an additional delay of ⅛ of a clock cycle has been applied to clock B (820). A bit sequence (821) is sent from chip B to chip A, received at chip A, sent back to chip B, and received at chip B with every positive transition of the signal clock B (826). Thus, the signal DATA A RCV (827) is obtained at chip B. This signal (827) is delayed 3 clock cycles with respect to the initial bit sequence (820), which means that n(real) has changed from 2 to 3. According to step (717), n real is no longer eqal to n(ideal). Therefore, this transiton delay of clock B is stored to the variable B1 (718). Next, the delay that actually has to be applied to either clock A or clock B has to be determined. As A1 is larger than B1 (719), delay A has to be set to (½)*(⅛–⅛)=⅛ of a clock A cycle (720).

Figure 8D:
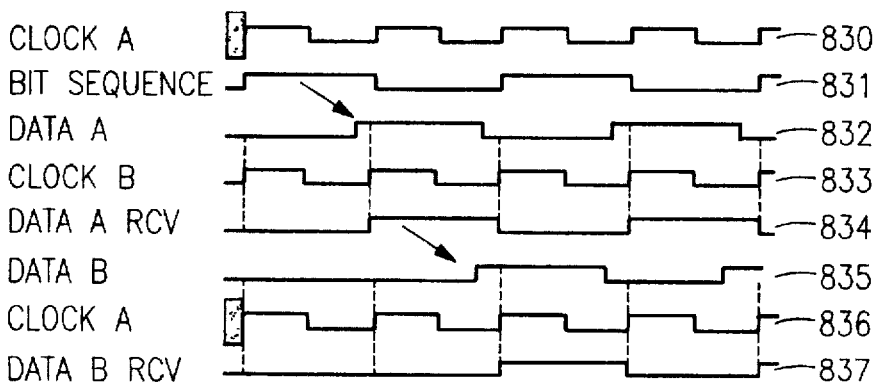

When clock delay A is set to this value, which is shown in FIG. 8D, the clock skew between clock A and clock B is compensated, and both clocks A (830) and B (833) are synchronized. The number of clock cycles that it takes for a bit sequence (831) to be transferred from chip A to chip B and back (837) is 2 now. In the case of the clock skew being compensated, the condition n(real)=n(ideal) is fullfilled, and data transfer is optimized.

Figure 9A:
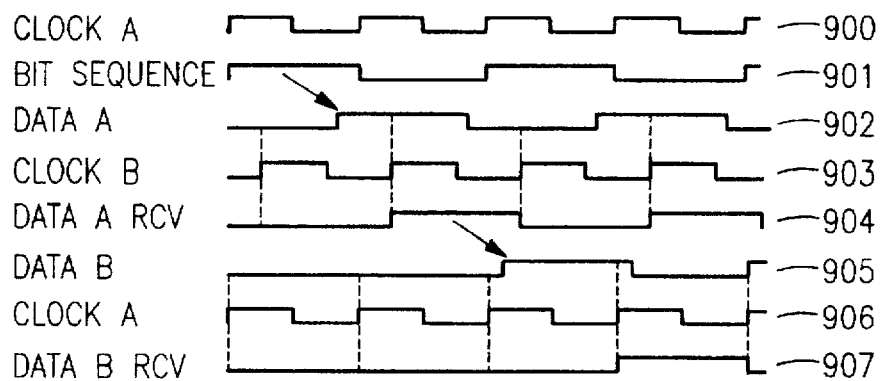
FIGS. 9A–9D show the timing of the signals that arise when synchronizing chip clocks according to the method given in FIGS. 7A–7C in case the clock skew is not as small as in FIGS. 8A–8D.
Figure 9B:
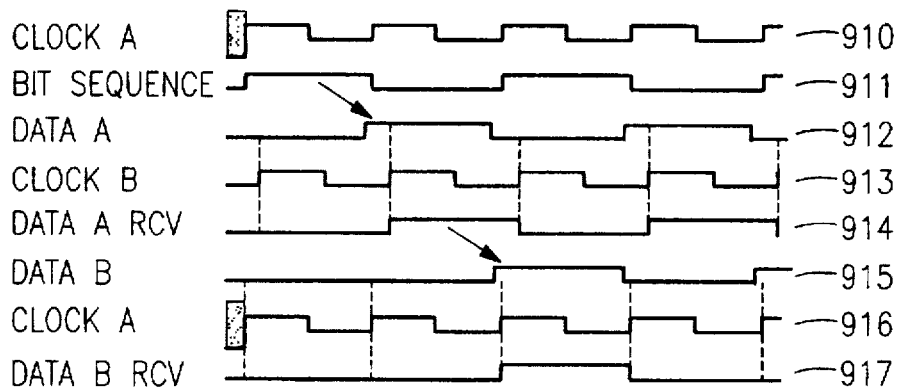

In FIG. 9A, a different situation is shown. Again, clock A (900) and clock B (903) are not in phase. When no additional clock delay is applied to either clock A or clock B, the number of cycles necessary to transfer a bit sequence (901) from chip A to chip B and back is equal to 3. As n(ideal) is equal to 2, initially the condition n(real)=n(ideal) (702) is not fullfilled, and the procedure of clock skew compensation is continued with step (730) in FIGS. 7A–7C. Clock delay A is incremented (730) until either a maximum delay value is reached (731) or a transition of the value of n(real) is detected (733). In the situation shown in FIGS. 9A–9D, said transition occurs when an additional delay of ⅛ of a clock cycle is applied to clock A (910). When comparing the initial bit sequence signal (911) to DATA B RCV (917), both signals are only 2 clock cycles apart. Therefore n(real) has changed its value from 3 to 2, and the clock A delay where this transition happened is stored to A1 (734).

Figure 9C:
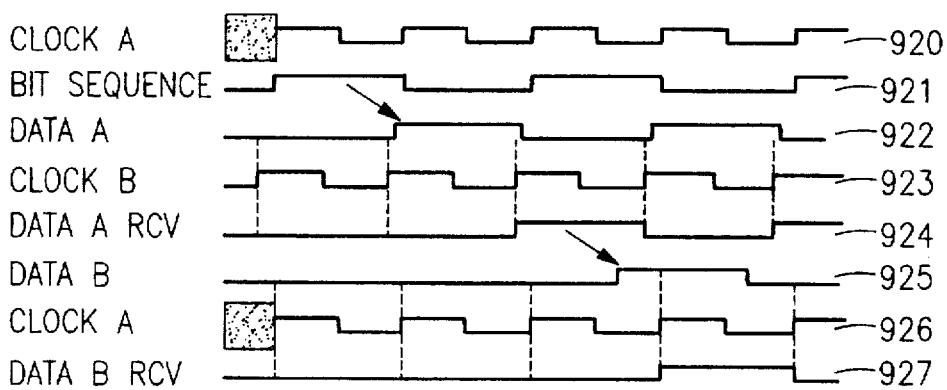
Figure 9D:
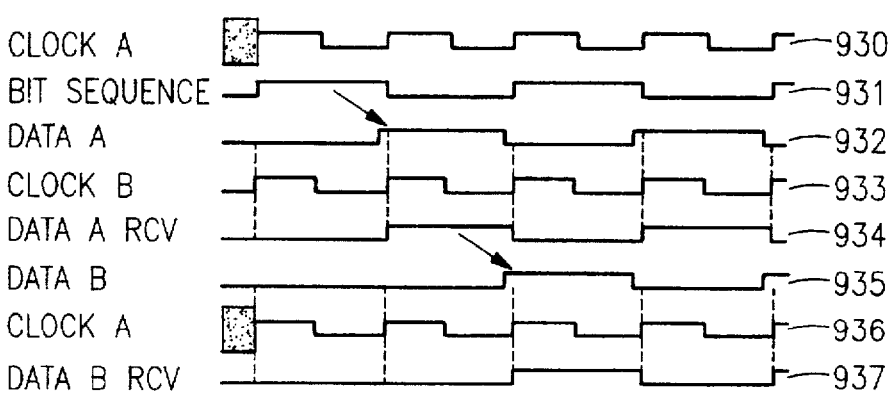

In order to find the second transition, clock delay A is further incremented, according to step (735), until the value of n(real) switches again (737). This is shown in FIG. 9C. When a clock A delay of ⅜ of a clock cycle is applied the phase shift between the initial bit sequence (921) and the signal DATA B RCV (927) amounts to 3 clock cycles. Therefore, the expected transition has just occured. The corresponding delay A value is stored to the variable A2, according to step (738). Next, the mean value of A1 and A2 is calculated and the delay that is obtained is applied to clock A (739). As A1 is equal to ⅛ and A2 is equal to ⅜, the mean value is ¼. FIG. 9D shows the situation where clock A is further delayed by one quarter of a clock cycle (930). Clock A (930) and clock B (933) are in phase, the clock skew is compensated. The number of cycles a bit sequence (931) needs to travel from chip A and chip B and back is equal to 2. Therefore, the condition n(real)=n(ideal) is fullfilled, which means that a good data transfer rate can be achieved.

So far, the compensation of chip to chip clock skew has been discussed with respect to one single inter-chip connection. In case a multitude of chips has to be synchronized, one can perform the clock adjustment with respect to the worst case connection. This means that chips are chosen which are far apart, in order that the wiring delay between these chips is a maximum. Next, the method of FIGS. 7A–7C is performed between said two chips.

Figure 10:
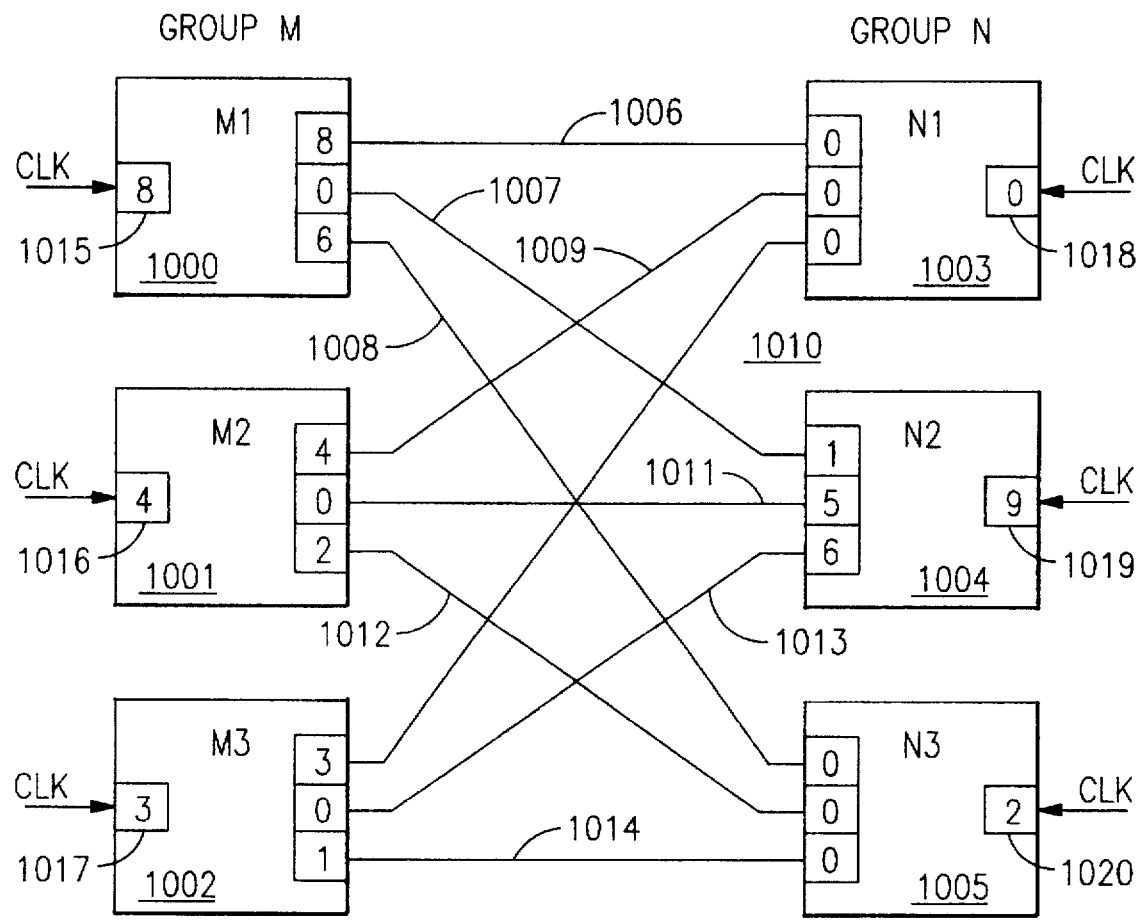
FIG. 10 shows how the method for clock skew compensation can be applied to a multitude of chips.

But it is also possible to actually synchronize a multitude of chip clocks by applying the two-chip adjustment method to a number of pairs chosen from the multitude of chips. In FIG. 10 an example is given of how such a synchronization can be carried out. The chips of a multichip logic are usually arranged in groups. Each chip (1000, 1001, 1002) of a first group M is linked to each chip (1003, 1004, 1005) of another group N via interfaces and inter-chip connections. In the example of FIG. 10, two groups of three chips each are shown. Each chip hosts three inter-chip connections to chips of the other group and, with the two-chip method described before, for each inter-chip connection a clock adjustment value can be found, which has to be applied to the chip with the 'early' clock. For example, when looking at the connection (1006) between chip M1 (1000) and chip N1 (1003), the relative delay between the clocks on both chips, in arbitrary units, is 8. Chip M1 has the early clock, therefore, an additional delay of 8 has to be applied to chip M1 in order to synchronize it to the clock of chip N1.

When attempting to synchronize the chip clocks of all the chips, first of all the latest clock of all the chips has to be determined. In a next step, an additional delay has to be added to all the other clocks, in order to synchronize them to the 'late' clock. In the first place, chips that have no delay with respect to any chip of the other group are candidates for possessing the latest clock. But, as can be seen in FIG. 10, it is possible that several chips, such as N1 (1003) and N3 (1005), have no delay with respect to any chip of the other group, M. In this case, the latest clock can be found by comparing the delay values assigned to connections between these 'latest clock' candidates and one common chip of the opposite group (group M). For example, the connection (1006) between chip M1 (1000) and N1 (1003) has a delay value of 8, while the connection (1008) between M1 (1000) and N3 (1005) has a delay value of 6. Since 8 is greater than 6, chip N1 (1003) is the chip with the latest clock. Therefore, the additional clock delay (1018) of chip N1 (1003) can be set to zero. For simplicity of the example, all delay values are integers. If the delay values for the comparison are very close, then the respective delay values in chip M2 (4 and 2) and chip M3 (3 and 1) have to be taken into acount in order to find the chip with the latest clock. Again, it is found that the clock of chip N3 (1005) is early compared to the clock of chip N1 (1003).

The clock delays of chips in group M (1000, 1001, 1002) are now defined by the delays determined for the connections (1006), (1009), (1010) to the chip with the latest clock, to N1 (1003). Thus, an additional clock delay (1015) of 8 is found to be correct for M1 (1000), a clock delay of 4 (1016) is assigned to M2 (1001) and for M3 (1002), a clock delay of 3 (1017) is appropriate.

The clock delays for the chips N2 (1004) and N3 (1005) have to be calculated from the clock delay values of the chips in group M (1015, 1016, 1017) and the respective delay values of the inter-chip connections that connect said group M chips to N2 (1004) or N3 (1005). The connection (1011) between M2 (1001) and N2 (1004) requires a relative delay of 5 in N2. The clock delay value (1016) in M2 (1001) is 4. Therefore, the clock delay value (1019) required for chip N2 is equal to 4+5=9. Therefore the chip clock of N2 has to be delayed by a value of 9 (1019) with respect to the 'latest clock', which is the clock of N1. The inter-chip connection (1012) between M2 (1001) and N3 (1005) requires a relative delay of 2 in M2 (1001). As the clock delay value (1016) of M2 is 4, the clock delay value (1020) of N3 (1005) amounts to 4−2=2. Similar calculations with regard to chip M1 (1000) give a value 8−6=2, and with regard to chip M3 (1002), a result of 3−1=2 is obtained. For best results, the chip of group M should be selected which has the worst case connection, that is, the largest wiring delay, to the chip of group N under consideration.

Thus, with the method given the clock skew between a multitude of chips can be compensated and synchronization of all the chip clocks in a multichip system becomes possible. A prerequisit for performing the given method is that delay values can be quantified and communicated between chips. A method for quantifying delays was given in FIG. 5A and 5B. Thus, it is possible to implement a central clock adjustment unit that is able to read delay values from chips and, after performing the necessary calculations, adjusts each chip's clock delay.

I claim:

1. A method for synchronizing clocks of at least two chips in an information handling system, said clocks being accessible on each chip and delayable by variable clock delays, where at least two of said chips are connected with inter-chip connections, and
wherein the method comprises the following steps:
a) choosing two chips A and B whose chip clocks are to be synchronized;
b) systematically varying said variable clock delays of chip A and/or chip B while repeating the following six steps:
b1) sending a signal from chip A to chip B;
b2) receiving the signal at chip B according to chip B's clock;
b3) sending back the received signal to chip A;
b4) receiving the signal at chip A according to chip A's clock;
b5) in case the number of clock cycles n(real) the signal needs for travelling from chip A to chip B and back to chip A undergoes a transition from a number, that is different from n(ideal), to a given number n(ideal): storing the delay where said transition has occurred as a first transition delay;
b6) in case the number of clock cycles n(real) the signal needs for travelling from chip A to chip B and back to chip A undergoes a transition from said given number n(ideal) to a number, that is different from n(ideal): storing the delay where said transition has occurred as a second transition delay; and
c) setting said variable clock delay of chip A and/or chip B to a delay value which is determined as a function of said first and said second transition delay.

2. A method for synchronizing clocks according to claim 1, characterized in that
said delay value to which said variable clock delay of chip A and/or chip B is set is chosen to be the mean of said first and said second transition delay.

3. A method for synchronizing clocks according to claim 1, characterized in that
in case there are several of said inter-chip connections between said two chips A and B, the inter-chip connections with the largest transfer delay are chosen.

4. A method for synchronizing clocks according to claim 1, characterized in that
said chip clocks are supplied by one central clocking unit, which is connected to each chip.

5. A method for synchronizing clocks according to claim 1, characterized in that
a central clocking unit supplies each chip with a central clock, which is delayed by said variable clock delay and used as a phase reference signal for a phase locked loop circuit, with said chip clock generated by said phase locked loop circuit having a constant phase relationship to said phase reference signal.

6. A method for synchronizing clocks according to claim 1, characterized in that
said variable clock delay comprises a chain of single delay elements, and the total delay of said variable clock delay can be varied by adding single delay elements to the chain or by removing single delay elements from the chain.

7. A method for synchronizing clocks according to claim 1, characterized in that information about the respective value of said variable clock delay is exchanged between said chips A and B.

8. A method for synchronizing clocks according to claim 1, characterized in that said variable clock delay comprises a chain of single delay elements, and the time delay caused by a single delay element is quantified by determining the ratio of said time delay to one clock cycle.

9. A method for synchronizing clocks according to claim 1, characterized in that said variable clock delay comprises a chain of single delay elements, and the time delay caused by a single delay element is quantified by determining the ratio of said time delay to one clock cycle, and quantified values of the respective variable clock delays are exchanged between said chips A and B.

10. A method for synchronizing clocks according to claim 1, characterized in that information about the respective values of said variable clock delays are exchanged between said chips and a central clock adjustment unit.

11. A method for synchronizing clocks according to claim 1, characterized in that at least three of said chip clocks have to be synchronized, and the following steps are carried out:

determining the latest chip clock of all the chip clocks that have to be synchronized;

synchronizing all the chip clocks to said latest chip clock according to the method of claim 1.

12. A method for synchronizing clocks according to claim 1, characterized in that said variable clock delay comprises a chain of single delay elements, and the time delay caused by a single delay element is quantified by determining the ratio of said time delay to one clock cycle, and in that at least three of said chip clocks have to be synchronized, and in that quantified values of the respective variable clock delays are sent to and/or received from a central clock adjustment unit.

* * * * *